F. W. H. SHEPHERD.
COMPOSITE MACHINE TOOL.
APPLICATION FILED MAR. 12, 1917.
1,250,234.
Patented Dec. 18, 1917.
5 SHEETS—SHEET 1.
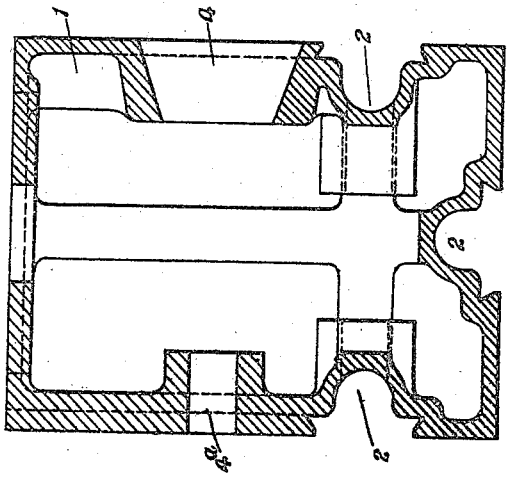
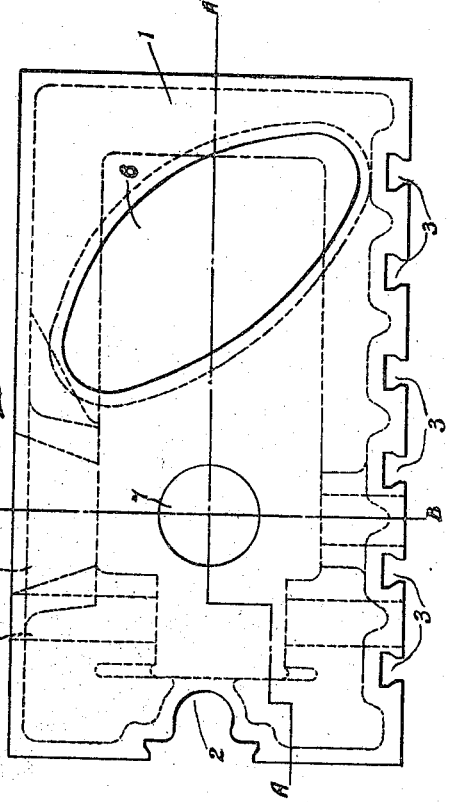
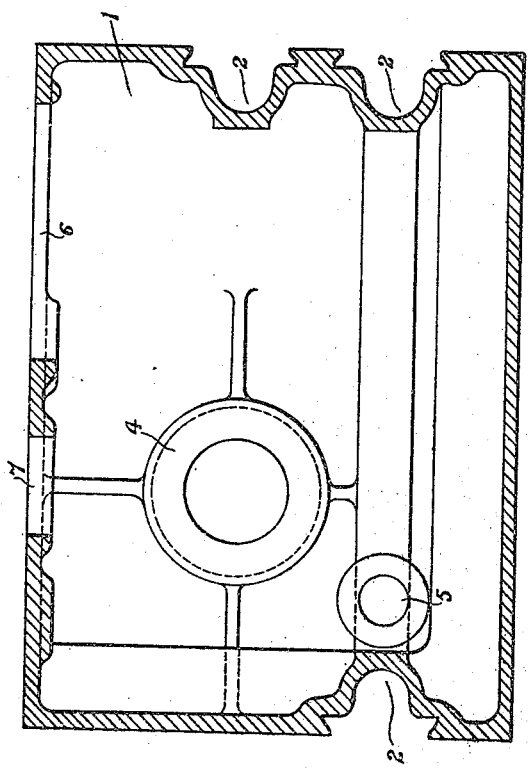
Inventor:
Frank W. H. Shepherd.
By: B. Singer
Atty

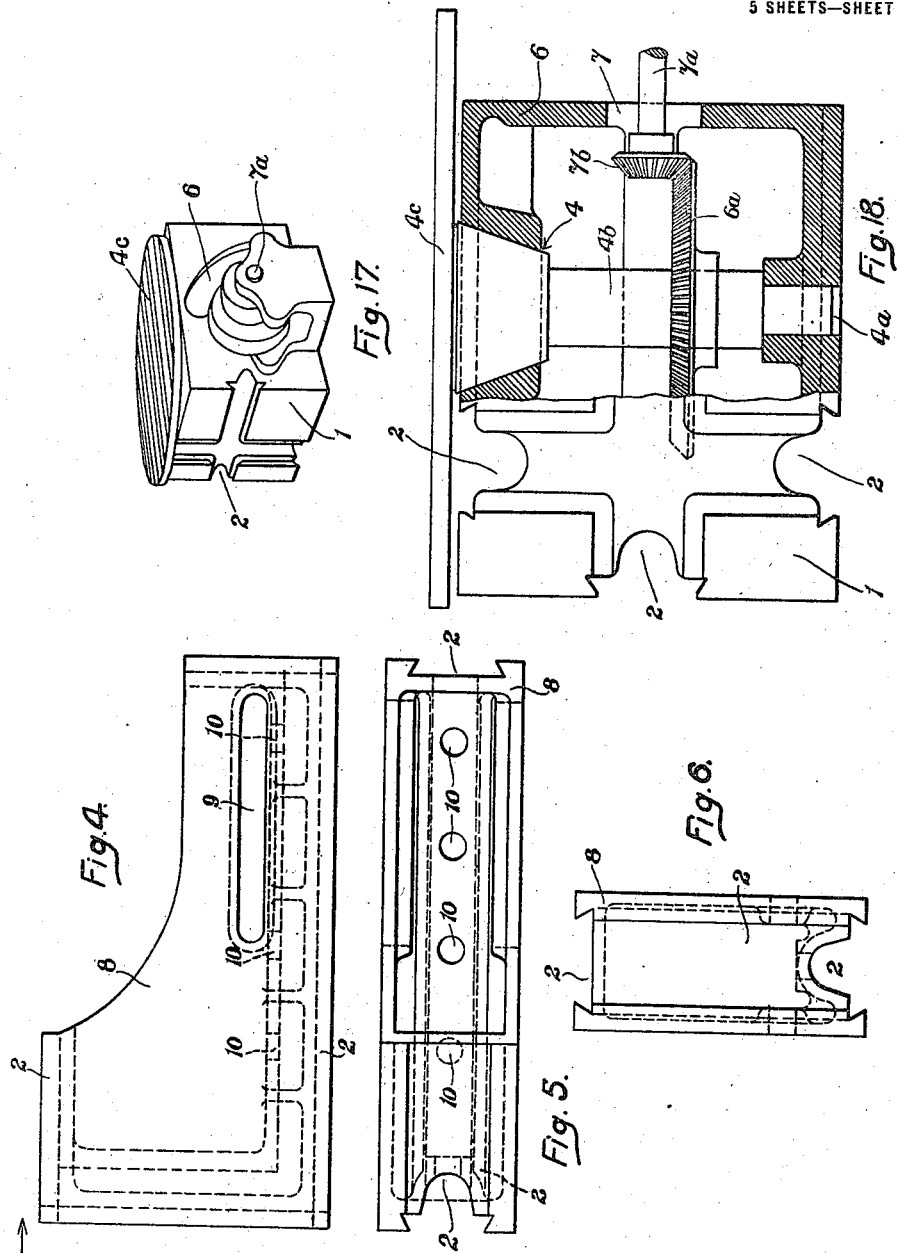

F. W. H. SHEPHERD.
COMPOSITE MACHINE TOOL.
APPLICATION FILED MAR. 12, 1917.
1,250,234.
Patented Dec. 18, 1917.
5 SHEETS—SHEET 3.
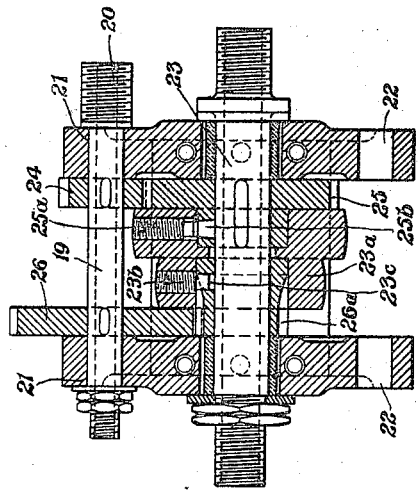
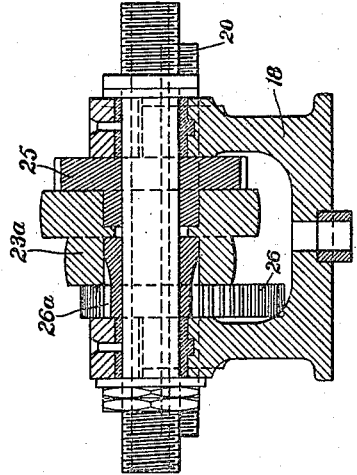
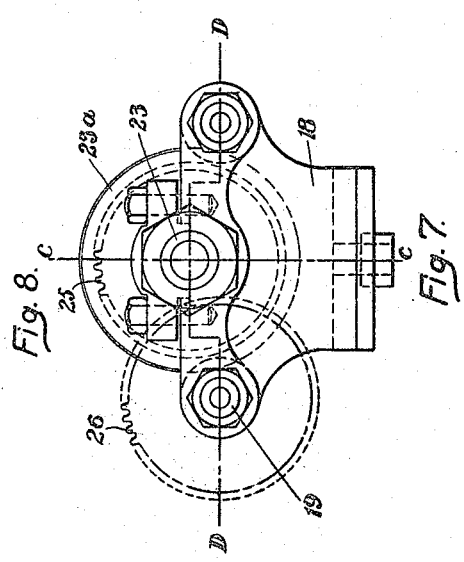

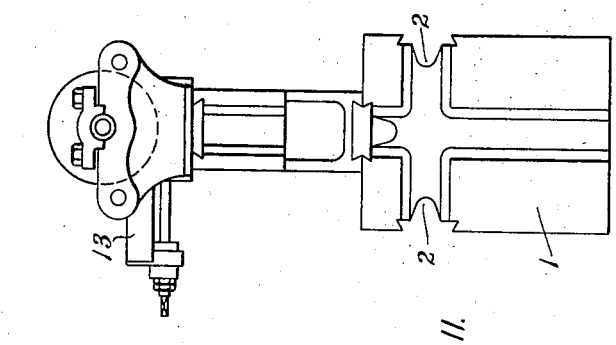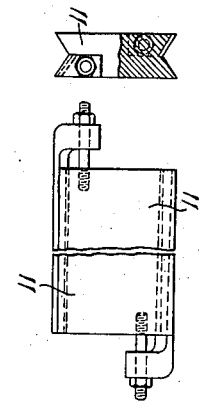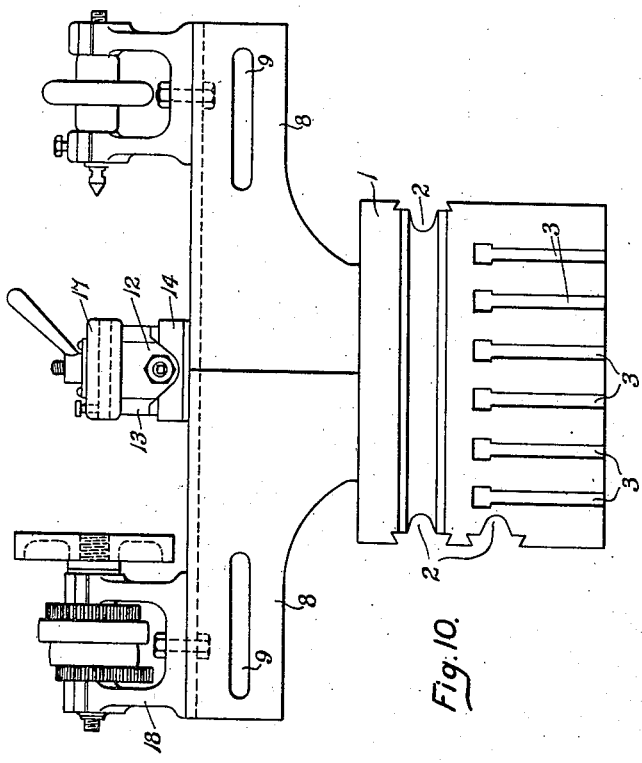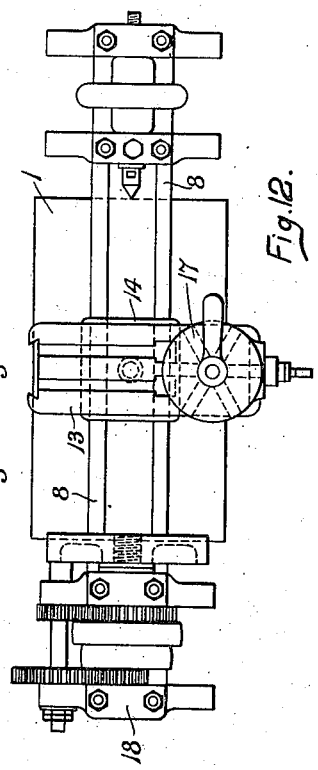

F. W. H. SHEPHERD.
COMPOSITE MACHINE TOOL.
APPLICATION FILED MAR. 12, 1917.
1,250,234.
Patented Dec. 18, 1917.
5 SHEETS—SHEET 5.
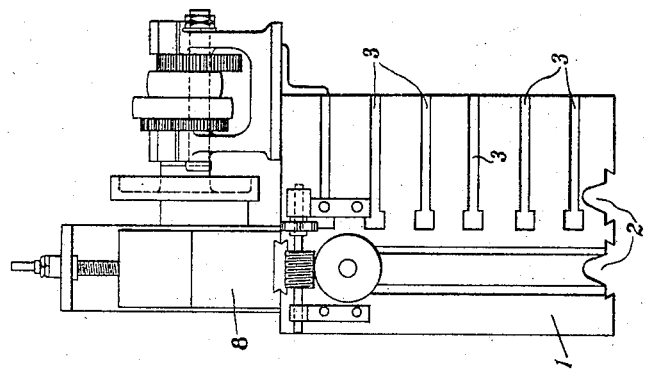
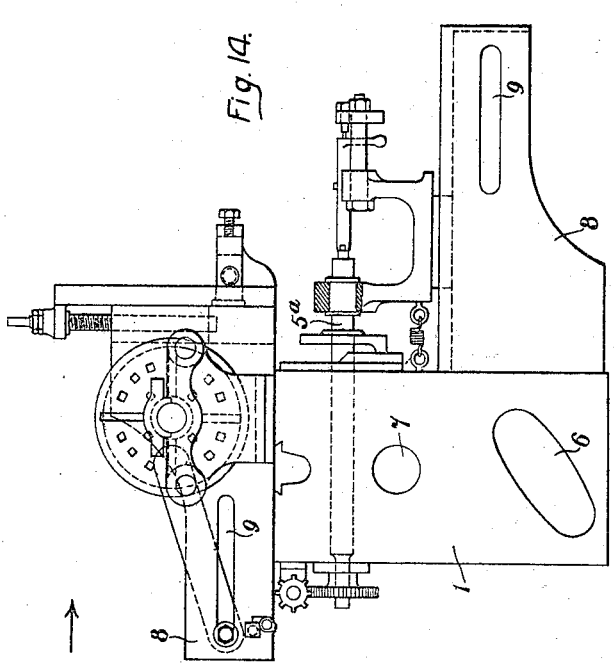
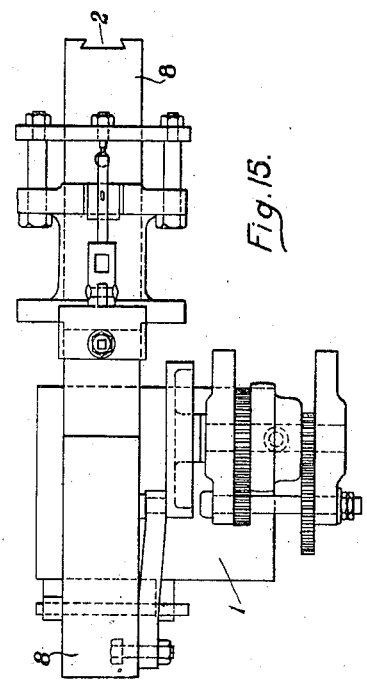

UNITED STATES PATENT OFFICE.

FRANK WILLIAM HARDING SHEPHERD, OF LONDON, ENGLAND.

COMPOSITE MACHINE-TOOL.

1,250,234.  Specification of Letters Patent.  Patented Dec. 18, 1917.

Application filed March 12, 1917. Serial No. 154,376.

*To all whom it may concern:*

Be it known that I, FRANK WILLIAM HARDING SHEPHERD, a subject of the King of Great Britain, and resident of London, England, have invented certain new and useful Improvements in Composite Machine-Tools, of which the following is a specification.

This invention relates to a new or improved composite metal working or like machine tool and has for its object to provide a machine tool composed of interchangeable parts capable of rapid rearrangement for effecting conversion from a tool of one character to a tool of another character from time to time as occasion demnds.

The manufacture of certain articles involves a number of operations of different character and although in some cases the use of special jigs enables a machine to be adapted for the particular operation required for the moment the difficulty is not entirely met and moreover the jigs have to be provided. As a result of the foregoing difficulties many workshops are unable to undertake certain classes of work without the expenditure of large sums of money on special machinery. Moreover, in fully equipped workshops while there is at some periods an over abundance of one class of work, say planing or shaping, for instance, there is insufficient of another, say turning and drilling and as a consequence while machines of one class are idle there is an insufficiency of another class.

It will be at once apparent that if a composite machine could be provided the parts of which could be so arranged that on one day the machine could be used for one purpose and the same main parts could then be rearranged so as to convert the machine to a form in which it could be used for another purpose entirely, great economic advantages would accrue. I by my invention accomplish this and provide a machine tool so constructed that the same main parts can be erected in various ways for performing various operations.

To give a few examples a machine constructed in accordance with my invention will be capable of use as a lathe, planing machine, shaping machine, boring or drilling machine, milling machine and in fact can be convertible to almost any required machine tool. The invention consists broadly of a machine tool consisting of a supporting structure comprising removable and interchangeable members capable of application to and association with each other in various relative positions and work and tool holding and operating adjuncts adapted to be applied to the supporting structure in various relative positions.

In one practical form, a machine constructed in accordance with the invention comprises a rectangular block or main member itself capable of erection in various positions, this block or main member being provided with dovetail grooves or slides upon some or all of its faces and various adjuncts adapted to be erected in various positions upon the main block or member, these adjuncts being provided with corresponding dovetail grooves or slides adapted to engage and be adjusted upon the grooves or slides of the main block or member.

In order that my invention may be more readily understood and carried into practice, reference is hereby made to the accompanying drawings wherein:

Figure 1 is a plan view of the rectangular main member.

Fig. 2 is a section on line A—A of Fig. 1.

Fig. 3 is a section on line B—B of Fig. 1.

Fig. 4 is a side elevational view of a knee bracket member.

Fig. 5 is a plan view of Fig. 4.

Fig. 6 is an end view of Fig. 4 looking in the direction of the arrow.

Fig. 7 is an end elevational view of a geared headstock constructed in accordance with my invention.

Fig. 8 is a section on line C—C of Fig. 7.

Fig. 9 is a section on line D—D of Fig. 7.

Fig. 10 is a side elevational view of a lathe built up in accordance with my invention.

Fig. 11 is an end elevational view of Fig. 10.

Fig. 12 is a plan view of Fig. 10.

Fig. 13 is a side and end view of a detail.

Fig. 14 is a side elevational view showing the assembly of parts for forming a radial shaping machine.

Fig. 15 is a plan view of Fig. 14.

Fig. 16 is an end elevational view of Fig. 14 looking in the direction of the arrow.

Fig. 17 is a perspective view of a disk grinder constructed in accordance with my invention, and Fig. 18 is a part sectional elevation on an enlarged scale of Fig. 17.

In these drawings wherein like numerals indicate like parts wherever occurring, the numeral 1 designates a hollow metal block which forms the main member or base piece upon which the component parts forming the different machine tools are built up. This main member which is capable of erection in various positions according to the particular tool it is desired to form, is provided with dovetail grooves or slides 2 upon some of its faces, while on one face a series of T slots 3 are formed to accommodate the heads of fixing bolts. In one face of the main member a conical hole 4 is provided and in the opposite face on the same axis a smaller cylindrical hole 4$^a$ is made, which holes form the bearings for the shaft 4$^b$ of a disk grinder or boring table 4$^c$, as shown in Fig. 18. A hole 5 is also provided running through opposite faces of the block for the accommodation of a shaft and may be used for the feed shaft 5$^a$ of a radial shaping machine as shown in Fig. 14. Another hole 6 of an elliptical shape is also provided in one face of the block for the purpose of enabling the driving bevel wheel 6$^a$ for the disk grinder or boring table shaft aforesaid, to be slipped in place. In the same face of the block a further hole 7 is provided to allow of a driving shaft 7$^a$ and pinion 7$^b$ being inserted to engage with the driving bevel wheel aforesaid.

Associated with the main member or block 1 are two knee brackets 8 which are also of hollow form, dovetail grooves or slides 2 being provided along the top, bottom, and ends, as shown particularly in Figs. 4, 5 and 6. In opposite sides of this bracket slots 9 are provided to accommodate bolts for fixing purposes, such as the driving arm of a shaping machine as shown in Fig. 14. Holes 10 are also provided to accommodate fixing bolts for attaching various parts of the different machines in position. The main member 1 is common to all the machines, and in some only one knee bracket is used in conjunction with the main member, and in other types of machines both knee brackets are used. These brackets are rigidly attached to the main member in any desired position by means of adjustable slides 11 formed with V edges which engage in the dovetail grooves in the main member and also in the corresponding grooves in the knee brackets, so allowing these parts to register together. To these main members various adjuncts can be erected in various positions, these adjuncts being provided with corresponding dovetail grooves or slides adapted to engage and be adjusted upon the grooves or slides of the main member or knee brackets.

In general the adjuncts aforesaid will consist of a slide rest 12, which when the machine is in use as a lathe will be slidable in the dovetail grooves or slides 2 in the knee brackets 8 which form the lathe bed as shown in Fig. 10. The slide rest aforesaid consists preferably of two main parts, one part 13 which may be called the slide and the other part termed the rest, and the whole may be carried upon a swivel head 14. This swivel head preferably consists of a plate provided with a dovetail groove or fillet upon its underside for registering with the corresponding fillet or groove in the members forming the bed of the lathe, and the said plate will be provided with a central socket or spigot as the case may be, with which a spigot or socket on the slide rest will engage. Associated with the slide rest is the turret tool holder 17. The slide rest will also become the tool head for a planing and shaping machine or slotting machine in a vertical instead of horizontal plane. In another form the machine may take the slide rest will become the work table of a milling machine or a profiler or a shaping machine or slotting machine or the boring table for a boring machine or drill.

When arranged as a planing machine the main member or block 1 is used as a base on the side of which a headstock is fixed, with the mandrel in a vertical position carrying a faceplate, the drive being transmitted from this faceplate by means of a connecting lever to the slide rest table slidably mounted in the dovetail grooves in the top face of the said block 1. The tool holder is slidably mounted on the end of one of the knee brackets 8, and this bracket is slidably arranged on the end of another knee bracket, which is bolted to the main member or block 1, so as to permit the tool-holder to overhang the sliding table in the desired position.

For drilling purposes, the component parts of the machine can be assembled to form either a horizontal or vertical drilling machine. In the former case the main member or block 1 and the knee brackets 8 would be arranged as shown in Fig. 10, the drill being held in a chuck in the ordinary way and the work clamped to the slide rest table, or another headstock may be substituted for the puppet head so forming a double ended drilling machine. In the vertical drilling machine the main member and knee brackets would be arranged as shown in Fig. 14, but in this case the headstock would be mounted in place of the tool holder, the mandrel being in a vertical position, while the slide rest table for carrying the work would be mounted on its supporting member immediately below the headstock.

When the machine takes the form of a grinding or boring machine as shown in Figs. 17 and 18, the slide rest table for holding the tool or the work, as the case may be, would be mounted on the end of one of the knee brackets 8, which bracket would be fixed to the upturned end of another knee bracket which in turn is secured to the side of the main member or block 1 in such a position as to maintain the said work or tool holder in the desired position above the rotatable table 4°.

Another essential element of the machine consists of an interchangeable back-geared headstock 18, shown particularly in Figs. 7, 8 and 9. An important feature of this headstock is the provision of a hollow back-gear spindle or countershaft 19, which spindle is also provided with a screwed nose 20 for taking chucks and the like. Bearings 21 and 22 are provided in the headstock casting so that the back-gear spindle 19 can be used on either side of the central mandrel 23. The aforesaid back-gear spindle can be driven at an increased speed ratio from the central mandrel by means of the toothed wheels 24 and 25, the toothed wheels 26 and 26ª being then put out of engagement with the driving pulleys 23ª by unscrewing the pin 23ᵇ clear of the hole 23ᶜ in the wheel 26ª. The locking pin 25ª is then screwed down so that its end engages with the hole 25ᵇ in the wheel 25, so putting in the high gear and disconnecting the back gear, as will be readily understood by reference to Fig. 9 of the accompanying drawings.

The back gear spindle or countershaft 19 of the headstock may be utilized as the cutter carrying spindle in various forms which the machine may take. If desirable the headstock may be provided with an electric or other motor as an integral part of it so as to provide the necessary drive, or the headstock may be provided with any desired number of driving pulleys. The block or main member of the machine may be as aforesaid provided with spindles adapted to be driven carrying various tools such for instance as circular saws.

The general nature of the invention and the manner in which it is to be carried into practice, will be appreciated from the foregoing, but it will be understood that many variations and modifications may be effected within the scope of this invention, the broad principle of which is to provide removable and interchangeable members capable of application to each other in various positions and various planes. Even what has been termed the block or main member may, of course, be built up of a number of parts, adapted to register together in various ways in various positions. It will be found possible with a machine consisting of detachable parts as hereinbefore indicated to erect the machine in a multitude of ways and a wide choice can be exercised so as to arrange the machine in the most beneficial way for the particular purpose in view. In other words a special machine can be erected from the same parts for each individual job. It will therefore be apparent that a machine shop provided with machines of the foregoing general character will be capable of coping with almost any class of work at any time.

What I claim and desire to secure by Letters Patent is:—

1. A composite machine tool consisting of a supporting structure comprising removable and interchangeable members adapted to be applied to and associated with each other in various relative positions, and work and tool holding and operating adjuncts adapted to be applied to the supporting structure in such various relative positions.

2. A composite machine tool comprising a main supporting member, a secondary supporting member or members, means for enabling the secondary member or members to be secured to the main member in various relative positions, and means for applying adjuncts such as a headstock, a tailstock, and a slide rest to the structure formed by the main and secondary supporting members in such various relative positions.

3. In a composite machine tool as set forth in claim 1 a rectangular main supporting member capable of erection in various positions and provided with means whereby other members or adjuncts can be applied to its various faces substantially as specified.

4. In a composite machine tool as set forth in claim 1, secondary supporting members or knee brackets provided with means whereby they can be applied in various positions to the various faces of a rectangular main supporting member, said secondary supporting members or knee brackets being provided with means whereby work and tool holding and operating adjuncts can be applied to them in such various positions.

5. In a composite machine tool, a headstock having a hollow back gear spindle or countershaft and means whereby said spindle or countershaft may be utilized as a carrying spindle for a chuck cutter or the like.

6. In a composite machine tool, a prismatic base member having recesses and projections thereon on different faces adapting the member for use in building up any one of a number of different machine tools.

7. In a composite machine tool in combination, a rectangular block or main member capable of erection in various positions, said block having dovetail grooves or slides on certain of its faces, and a plurality of supplemental members having grooves or slides thereby the supplemental members are adopted to engage and be adjusted upon the grooves or slides on said block.

In testimony whereof I have affixed my signature in presence of two witnesses.

FRANK WILLIAM HARDING SHEPHERD.

Witnesses:
GEO. VAN DYNE,
H. S. BURSLEY.

Copies of this patent may be obtained for five cents each, by addressing the "Commissioner of Patents, Washington, D. C."